United States Patent

[11] 3,602,584

| [72] | Inventors | Peter Anderl<br>Munich;<br>Rainer Giesler, Munich; Theodor Steibl,<br>Maisach; Johann Roth, Schwabhausen<br>Near Dachau, all of, Germany |
|---|---|---|
| [21] | Appl. No. | 841,282 |
| [22] | Filed | July 14, 1969 |
| [45] | Patented | Aug. 31, 1971 |
| [73] | Assignee | Niezoldi & Kramer GmbH<br>Munich, Germany |
| [32] | Priority | July 12, 1968 |
| [33] | | Germany |
| [31] | | P 17 72 853.9 |

[54] ELECTROMAGNETIC RELEASE ARRANGEMENT FOR MOTION PICTURE CAMERAS
12 Claims, 7 Drawing Figs.

[52] U.S. Cl. ................................................ 352/174, 352/169
[51] Int. Cl. ........................................................ G03b 21/48

[50] Field of Search.......................................... 352/169, 174-179

[56] References Cited
UNITED STATES PATENTS

| 3,079,836 | 3/1963 | Schaefer.................. | 352/169 |
| 3,094,033 | 6/1963 | Thiele et al. ............. | 352/169 |
| 3,512,881 | 5/1970 | Kubota..................... | 352/178 X |

*Primary Examiner*—Donald O. Woodiel
*Attorney*—Michael S. Striker

ABSTRACT: A release arrangement for a motion picture camera in which a release member blocks the operation of the camera and disconnects the motor circuit through an electromagnet when the camera is in the inoperative state. By depressing the release button of the camera, the electromagnet becomes energized and the release member permits the camera to operate freely. A timing network is connected to the electromagnet for controlling the current flow through the motor from the instant that the new release button is depressed through the duration of operation of the camera.

INVENTORS
PETER ANDERL
RAINER GIESLER
THEODOR STEIBL
JOHANN ROTH

By: *Michael S. Auto*
ATTORNEY

3,602,584

ELECTROMAGNETIC RELEASE ARRANGEMENT FOR MOTION PICTURE CAMERAS

BACKGROUND OF THE INVENTION

The present invention resides in a motion picture camera with an arrangement in which a control magnet actuates the release member. In its normal inoperative state, this release member blocks the camera drive, and the motor circuit associated with the camera is open. When the releases button of the camera is actuated, the control magnet releases the blocking arrangement, and thereby permits the camera drive to operate freely, whereby the motor circuit is also closed.

Such a camera has the advantage that it may be remotely released through the application of an electrical transmission cable and simple pushbutton. This is in contrast to the arrangement used, heretofore, in the form of a Bowden control cable. A further advantage of a camera of the aforementioned species resides in the feature that it may be used for a number of different operating applications without requiring considerable equipment or complex operation.

The disadvantage of such a camera of the preceding species is, however, that high current requirements are incurred through the application of the control magnet and the camera drive.

Accordingly, it is an object of the present invention to eliminate this disadvantage of requiring high currents for the operation of a motion picture camera of the preceding species.

The object is achieved, in accordance with the present invention, by providing a timing network in the excitation circuit for the control magnet associated with the release arrangement.

It is of advantage to connect the timing network in shunt with the excitation coil of the control magnet. When the camera is set into operation, the control magnet thereby becomes provided with its pull-in current. After the initial starting of the camera, however, the control magnet is provided with only a substantially smaller holding current, during operation of the camera.

In the application of amateur cameras, it is of particular advantage to provide for optimum space utilization, and to provide for the minimum possible wear in the use of the camera. As a result of such requirements for amateur cameras, it is desirable to provide the camera with an electronic release arrangement which may be switched to different operating modes in which the excitation circuit for the control magnet may be actuated in the use of the camera. In such an electronic arrangement, it is of advantage to connect the timing network between the release button and the control magnet. At the same time, it is desirable that this timing network be in the form of a transistor unit for releasing electronically the camera. It is desirable, furthermore, that one of the transistor stages within this transistorized unit be connected before or after the control magnet and within the excitation circuit for this magnet. The arrangement of this electronic transistor stage is to be such that the operating point at the input or output characteristics of this transistor stage shifts in the direction so as to reduce the excitation current.

SUMMARY OF THE INVENTION

A release arrangement for a motion picture camera in which a release member mechanically blocks the operation of the camera and disconnects the motor circuit of the camera when the latter is in inoperative state. An electromagnet or solenoid with electromagnetically actuated armature is mounted in proximity of the release member and actuates the latter when the circuit to the electromagnet or solenoid is closed by depressing the release button of the camera. Once the electromagnet becomes energized, the release member which may be in the form of a lever, permits the camera to operate freely, and closes the motor circuit. A timing network is connected in the circuit of the electromagnet for controlling the current flow through the motor so as to reduce the current flow to the holding requirements of the magnet after an initial interval from the instant that the release button is depressed. The release member is in the form of a two armed lever having one arm operating in conjunction with the electromagnet, and the other arm reaching into a cutout of an abutting member mounted upon the operating and driving shaft of the camera. This shaft is geared to the motor which turns the shaft during operation of the camera. The lever has a nose-shaped portion reaching into the cutout of the abutting member for blocking the latter when the camera is in the inoperative state. The timing network for controlling the current flow through the motor is a transistorized unit provided with RC networks.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
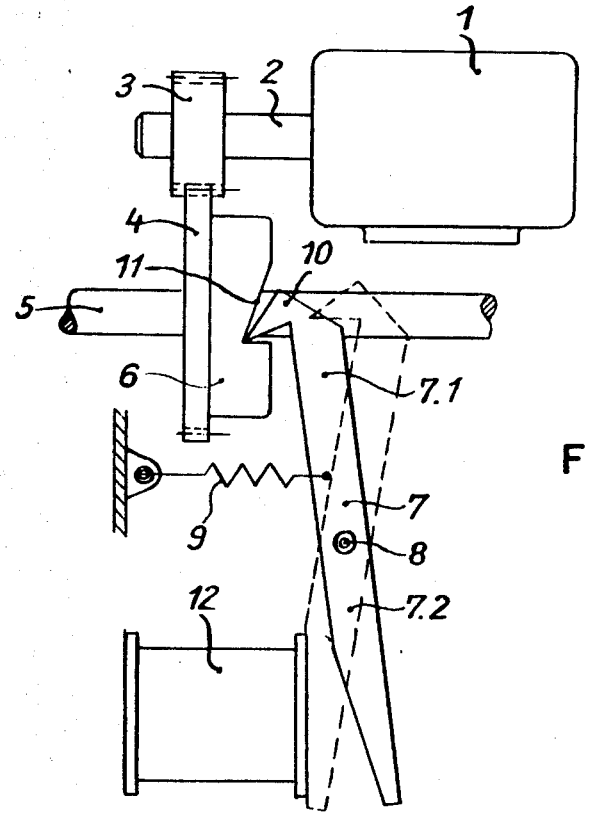
FIG. 1 is a functional schematic diagram of an electromagnetically controlled release arrangement for a motion picture camera, in accordance with the present invention.

Referring to the drawing and in particular to FIG. 1, the motion picture camera of the present invention has a DC motor 1 which is used as a driving motor. The shaft 2 of this motor is geared to a shaft 5, by means of the driving gears 3 and 4 meshing with one another. The shaft 5 is the main operating shaft of the camera. The main operating shaft 5 carries the shutter and controls, in the conventional manner, and the mechanism of the camera for transporting the film strip. Mounted upon the shaft 5, is an abutting wheel 6 which is secured to the shaft. This abutting wheel 6 operates in conjunction with a release member 7 which is constructed in the form of a two-armed lever which is rotatable about a fixed shaft 8. This lever 7 has the lever arms 7.1 and 7.2. A tension spring 9 is connected at one end to the lever 7 and is fixed at the other end. The release member or lever 7 is provided with a nose portion 10 which enters a cutout 11 when in the stationary state or nonoperative position. The cutout 11 is provided in the abutting wheel 6, and when the nose portion enters the cutout 11, the main driving shaft 5 is held in a predetermined position determined by the release member 7. When operating the camera, the release member 7 is transferred to the position shown in FIG. 1 by broken or dashed lines, as a result of current flow through the coil for establishing a magnetic field of a control electromagnet 12. When, the electromagnet 12 becomes thus energized, so that a magnetic field is established to act upon the release member 7, the latter becomes attracted to the magnet core with its arm portion 7.2, and this transfer of the lever 7 to the position designated by broken lines in FIG. 1 results in tensioning of the spring 9. When the lever 7 is pivoted against the action of the spring 9, the nose portion 10 is moved out of the cutout 11, so that the abutting wheel 6 together with the main drive shaft 5 become released.

Figure 2:
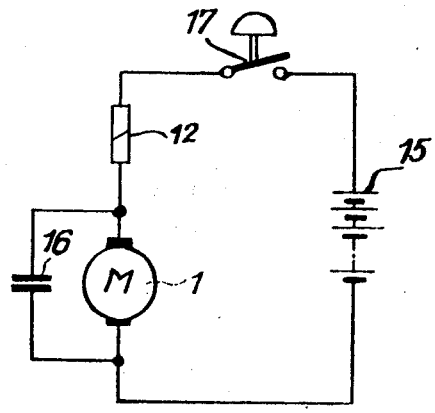
FIG. 2 is an electrical schematic diagram of the excitation circuit for an electromagnet used in the release arrangement in FIG. 1.

The coil of the electromagnet 12 is connected in series with the shunt winding of the operating motor 1, as shown in FIG. 2. A voltage source 15 provides the energy and current for the circuit. Connected in parallel with the shunt winding of the operating or driving motor 1 is a capacitor 16 which serves as a timing element. Through this circuit arrangement of FIG. 2, the current circuit for the motor is identical with that for the control electromagnet 12. A momentary contact switch or actuating means 17, as for example, a pushbutton, serves to close the excitation circuit of the camera.

At the instant that the circuit is closed, maximum excitation current is applied to the electromagnet 12. This current, at the instant of closing the circuit, is limited only by the internal resistance of the coil of the electromagnet 12, since the motor is essentially out of the current circuit, as a result of the timing 16 which is uncharged. As the timing element or capacitor 16 becomes charged with time, increased current flows through the driving motor 1. The excitation current through the entire circuit at the same time decreases. When the charging process for the timing element or capacitor 16 has terminated, minimum excitation current flows through the entire circuit, and such current now also flows through the motor. The magnitude of this current flow must be such that the holding current for the electromagnet 12 is maintained. At the same time, the magnitude of the current must be sufficient to operate the motor so that the latter can rotate against its load torque and be set into motion.

The maximum field strength of the electromagnet 12 thereby occurs when the circuit is switched on. In this manner the initial delay in starting the motor 1, may be advantageously used for removing the nose portion 10 of the release member 7 out of the cutout 11 of the abutting wheel 6, and thereby release the main driving shaft 5 so that it is freely rotatable. Consequently, this initial delay in starting to operate the motor 1 permits freeing of the shaft 5 prior to commencement of rotation of the motor. The parallel connection of the timing element 16 with respect to the motor 1 provides a further advantage. Thus, the intense current pulse occurring at the instant of switching on the circuit and applying full power to the circuit, is avoided through the DC motor. Such high current through the motor when starting the operation is undesirable due to the condition that the induced back electromotor force is not, as yet, available when the motor is switched on and full power is applied. DC motors, when operated under conventional conditions and arrangements, usually are subjected to such high currents when starting, in the absence of the capacitor 16.

Figure 3:
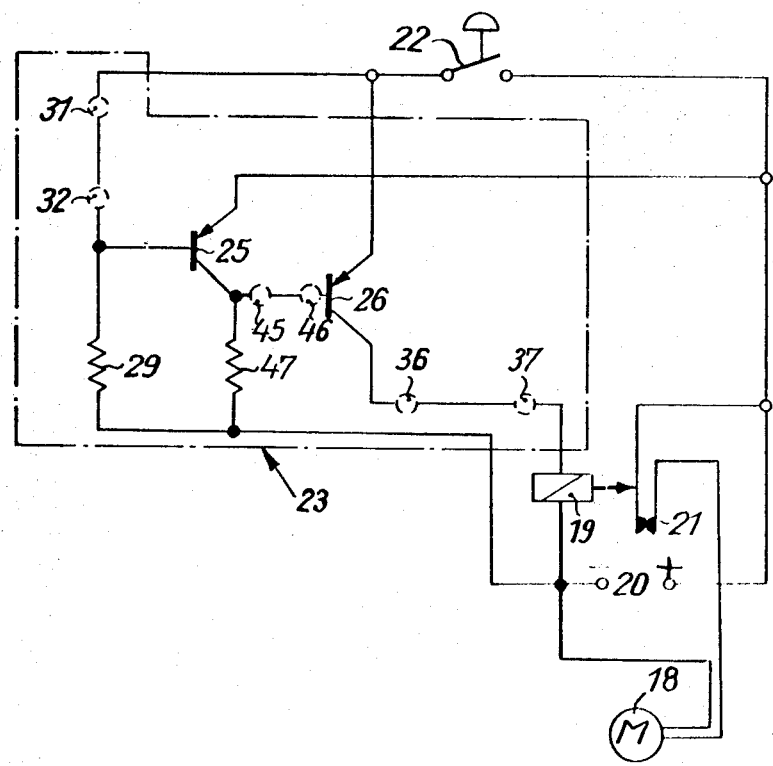
FIG. 3 is an electrical schematic diagram of an electronic transistorized circuit operating in conjunction with the release arrangement of the camera.

In the embodiment of FIG. 3, the motor 18 is connected in parallel with the circuit of the control magnet 19, contrary to the condition prevailing in FIG. 2. The electromagnet 19 operates a pair of contacts 21 through which the motor is connected across the terminals of the power supply 20. A transistorized unit 23, lies between the control magnet 19 and the release button 22. This transistorized unit 23 serves as an electronic release for the camera.

In one embodiment of the transistorized unit 23, the latter has an electronic switch which is essentially composed of two transistors 25 and 26 of identical conductivity type. In the case PNP type of transistors, the emitter of the transistor 25 is directly connected to the positive terminal of the voltage source 20. The emitter of the transistor 26, on the other hand, leads to this positive terminal of the voltage source 20 by way of the release button 22. The collector of the transistor 25 is connected to the base of the transistor 26. Transistor 25 is, at all times connected to the voltage source 20, and when in the quiescent state of the arrangement, this transistor 25 is maintained in the conducting state, as a result of the base potential applied to this transistor through the resistor 29. When the transistor 25 is conducting, the base of the transistor 26 is positive to the extent that it is turned off, in the quiescent state. Upon depressing the release button 22, the full positive potential of the voltage source 20 is directly applied to the base of the transistor 25. The base-emitter voltage is thereby made zero and the transistor 25 is turned off or cut off. As a result, the base potential of the transistor 26 becomes negative to the extent that this transistor 26 becomes conducting or turned on, and the excitation circuit for the control magnet 19 becomes thereby closed. Since the collector of the transistor 26 is directly connected to the control magnet 19, the full current flows from the positive terminal of the voltage source 20 and through the emitter-collector path of the transistor 26, as well as the control magnet 19. As a result of such energization of the magnet 19, the mechanical lock of the camera is released, and the motor 18 becomes switched on, due to the switching contact 21 which is operated by the control magnet 19. This circuit state remains for as long as the release button 22 is depressed or actuated.

Figure 3A:
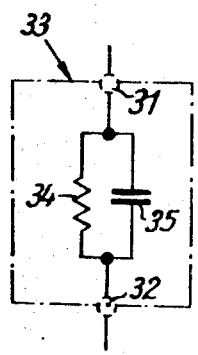
FIG. 3a illustrates a first timing network which can be used in the circuit of FIG. 3.

Assume, now, that a timing network 33 (FIG. 3a is connected between the terminals 31 and 32. This timing network 33 consists of a resistor 34 connected in parallel with a capacitor 35, in accordance with the construction of FIG. 3a. If, with this timing network connected across the terminals 31 and 32 and with the capacitor 35 discharged, the release button 22 is depressed, the base-emitter voltage and thereby the collector-emitter current of the transistor 25 are substantially zero at the first instant of switching on the circuit through depression of the release button 22. Full current then flows from the source 20 through the emitter-collector path of the transistor 26, and through the electromagnet 19, as described above. As the capacitor 35 becomes charged, the voltage across the timing network 33 steadily increases, since the DC resistance of this timing network increases, since the DC resistance of this timing network increases. Expressed in other terms, as the capacitor 35 charges, the voltage across this capacitor and hence across the timing network 33 increases. When the capacitor 35 has become charged to its maximum level, the DC resistance across the timing network 33 corresponds to the resistance 34. When this circuit state has been attained, the base-emitter voltage and thereby the collector current of the transistor 25 become also increased. As a result of an increased collector current through the transistor 25, the base potential of the transistor 26 is shifted to a positive value, and the current through the emitter-collector path of the transistor 26 and hence the control magnet 19 is inhibited. The voltage divider for the base of the transistor 25 thus consists of the timing network 33 and the resistor 29. These components are selected in their component values so that when the charging process for the capacitor 35 has been completed, the collector current through the transistor 26 is not below the minimum holding current for the control magnet 19.

Figure 3B:
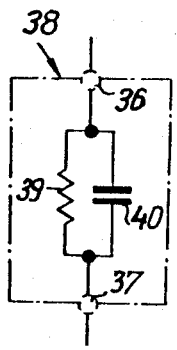
FIG. 3b illustrates a second timing network which can be used in the circuit of FIG. 3.

In accordance with another embodiment illustrated in FIG. 3b, a timing network 38 is connected across terminals 36 and 37 in place of the timing network 33 between the terminals 31 and 32. The timing network 38 consists of a resistor 39 and a capacitor 40, and provides the output resistance of the transistor 26, next to the coil resistance of the electromagnet 19. With the timing network 38 connected into the circuit in the aforementioned manner, and with the capacitor 40 in discharged condition, maximum collector current results when the release button 22 is depressed. Such maximum collector current occurs at the initial instant or initial phase upon depressing or actuating the release button 22. When the charging process for the capacitor 40 has become completed, on the other hand, minimum current flow prevails from the voltage source 20 and through the emitter-collector path of the transistor 26, as well as the resistor 39 and the control magnet 19.

Figure 3C:
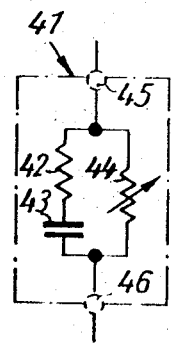
FIG. 3c illustrates a third timing network which can be used in the circuit of FIG. 3.

An alternative embodiment to those illustrated in FIGS. 3a and 3b is given in FIG. 3c. In this latter embodiment a further timing network 41 is provided between the terminals 45 and 46 shown in FIG. 3. This timing network 41 consists of a resistor 42 connected in series with a capacitor 43. This series combination of the resistor 42 and capacitor 43 is, in turn, connected in parallel with an adjustable resistor 44. When the transistor 25 is turned off upon depressing the release button 22, then the timing network 41 exhibits its minimum DC resistance, provided that the capacitor 43 is initially discharged. The base-emitter voltage and thereby also the collector current of the transistor 26 hence achieve their maximum values. As the charging of the capacitor 43 progresses, the DC resistance of the timing network 41 increases. When the capacitor 43 has become fully charged, the resistance value of the timing network attains the value of the adjustable resistor 44. The base of the transistor 26 thereby acquires its maximum positive potential, and as a result the base-emitter voltage as well as the collector current of the transistor 26 assume their minimum values.

Figure 4:
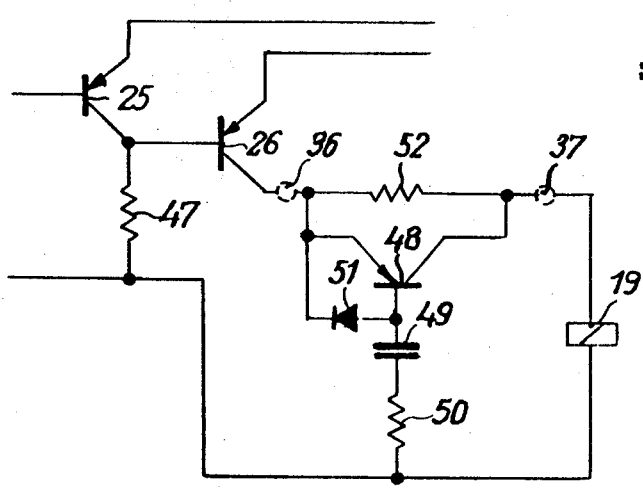
FIG. 4 is a functional schematic diagram of another embodiment of FIG. 3.

In accordance with the embodiment of FIG. 4, the transistor unit 23 in FIG. 3 is expanded to include a transistor 48 connected in common base circuit between the terminals 36 and 37 shown in FIG. 3. If the transistor 26 is made to conduct or is turned on by depressing the release button 22, then the emitter of the transistor 48 acquires positive potential. The transistor 48 becomes thereby also turned on or transferred to the conducting state. A capacitor 49 connected in series with the base of the transistor 48 will cause the base of this transistor 48 to drop to a negative potential, when the capacitor 49 has not been charged. In this circuit state, full collector current flows through the transistor 48 and through the electromagnet 19. As the capacitor 49 commences to charge, the base potential of the transistor 48 becomes increasingly more positive. When the capacitor 49 has become fully charged, only a substantially small base-emitter voltage prevails at the transistor 48, and thereby only a substantially small collector current flows through the control magnet 19. This amount of collector current is, however, greater in magnitude than the minimum holding current required for the control magnet 19.

When the release button 22 is no longer depressed or actuated, the capacitor 49 discharges through the resistor 50, as well as the series circuit including the diode 51, the resistor 52, and the coil of the control magnet 19.

It will be understood that each of the elements described above, or two or more together, may also find a useful application in other types of release arrangements for motion picture cameras differing from the types described above.

While the invention has been illustrated and described as embodied in a release arrangement for motion picture cameras, it is not intended to be limited to the details shown, since various modifications and structural changes may be made without departing in any way from the spirit of the present invention.

What is claimed as new and desired to be protected by Letters Patent is set forth in the appended claims.

1. A release arrangement for a motion picture camera comprising, in combination, a motor for operating said camera; a release member blocking the operation of said camera when said release member is in the inoperative position, the circuit of said motor being open when said release member is in said inoperative position; an electromagnet for actuating said release member; actuating means connected to said electromagnet for actuating said release member and closing said circuit of said motor when said actuating means is actuated, said release member being transferred to the operative position when actuated by said electromagnet, the operation of said camera being free form being blocked by said release member when in said operative position; and timing means connected to said electromagnet for controlling the current flow through said motor.

2. The release arrangement for a motion picture camera as defined in claim 1 wherein said electromagnet is connected in series with said motor, said timing means being connected in shunt with said motor.

3. The release arrangement for a motion picture camera as defined in claim 1 wherein said timing means comprises transistorized electronic means having a transistor stage connected to said electromagnet so that the current through said electromagnet is diminished through shifting of the operating point of said transistor stage.

4. The release arrangement for a motion picture camera as defined in claim 3 wherein said transistorized electronic means is connected between said actuating means and said electromagnet.

5. The release arrangement for a motion picture camera as defined in claim 1 wherein said timing means includes a resistor-capacitor network wherein a resistor is connected in parallel with a capacitor.

6. The release arrangement for a motion picture camera as defined in claim 1 wherein said timing means includes a resistor-capacitor network comprising a resistor; a capacitor connected in series with said resistor to form a series resistor-capacitor circuit; and adjustable resistor means connected in parallel with said series resistance-capacitance circuit.

7. The release arrangement for a motion picture camera as defined in claim 1 including switching contact means operated by said electromagnet for opening and closing the circuit of said motor as a function of the operating state of said electromagnet.

8. The release arrangement for a motion picture camera as defined in claim 1 wherein said release member comprises a two armed lever rotatable about an axis between the two arms of said lever, one arm of said lever being magnetically actuatable by said electromagnet.

9. The release arrangement for a motion picture camera as defined in claim 8 including an operating shaft member driven by said motor for operating said camera; and an abutting member secured to said operating shaft member and rotatable therewith, said abutting member being engaged by said lever for inhibiting rotation of said shaft and thereby blocking the operation of said camera; and spring means connected to said lever for acting upon said lever in opposition to the actuation of said lever by said electromagnet.

10. The release arrangement for a motion picture camera as defined in claim 9 wherein said abutting member has a cutout entered by said lever for inhibiting rotation of said shaft, said lever having a nose-shaped portion for entering said cutout.

11. The release arrangement for a motion picture camera as defined in claim 9 including gear means for mechanically connecting said motor to said shaft for operating said camera when said shaft is freely rotatable and free from being blocked by said release member.

12. The release arrangement for a motion picture camera as defined in claim 1 wherein said electromagnet is a solenoid with electromagnetic coil and electromagnetically actuated armature.